Jan. 23, 1940.  S. B. BROWN  2,188,072
LIQUID FUEL CONVERTER
Filed Aug. 2, 1937  3 Sheets-Sheet 3

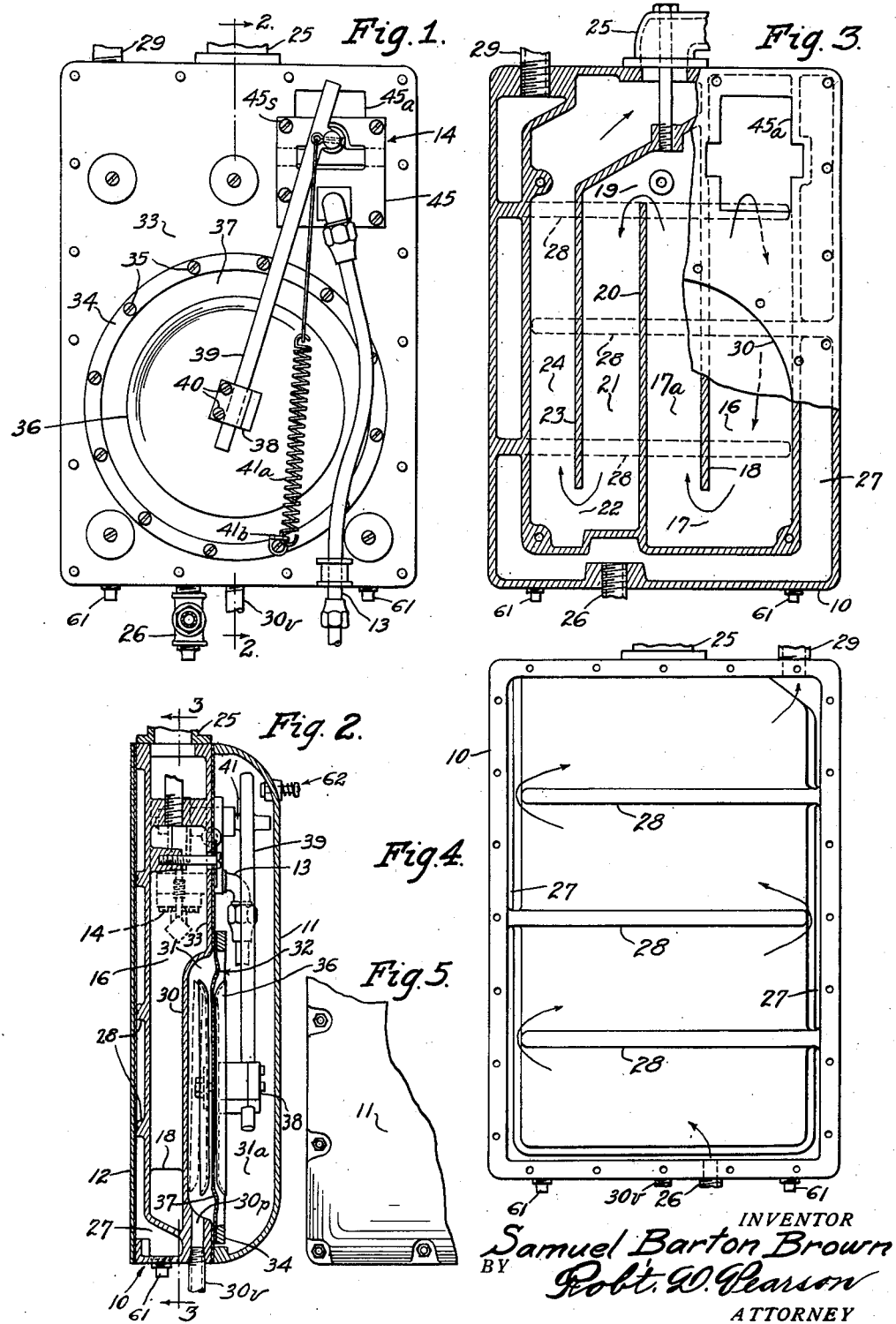

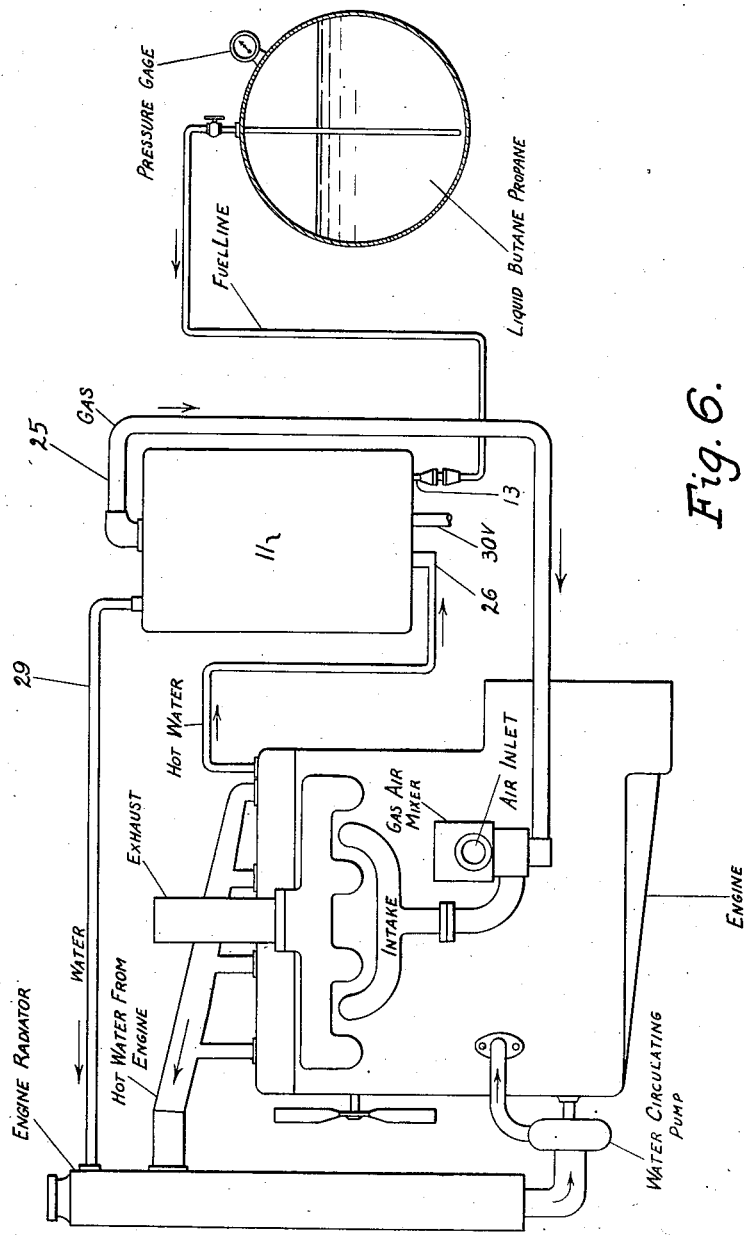

INVENTOR
Samuel Barton Brown
BY Robt. W. Pearson
ATTORNEY

Patented Jan. 23, 1940

2,188,072

UNITED STATES PATENT OFFICE 2,188,072

LIQUID FUEL CONVERTER

Samuel Barton Brown, Los Angeles, Calif., assignor, by mesne assignments, to American Liquid Gas Corporation, Los Angeles, Calif., a corporation of California Application August 2, 1937, Serial No. 156,880

4 Claims. (Cl. 257—2)

This invention relates to a device for converting a liquid petroleum into a dry gas. It combines in one device a heat exchanger and a regulator for use in combination with an internal combustion engine or other device or appliance that requires a dry gas. When used in combination with an internal combustion engine it may be used to supply dry gas to any gas-air mixing device for the operation of the engine.

When butane-propane is used as a fuel it is necessary to convert this liquid into a dry vapor at or near atmospheric pressure so it may be conveniently used. In this condition it may be delivered to a gas-air mixing device attached to an internal combustion engine.

The apparatus, in its preferred form, comprises a diaphragm controlled valve, the diaphragm of said valve overlying a diaphragm chamber in one part of the casing, there being adjacent to this part of the casing another casing part which is furnished with a tortuous passage through which the vaporized liquid after passing said valve is lead or conducted to be heated in said passage to such an extent that when it emerges therefrom in a dry vapor or gaseous form it is at a temperature suitable for a great variety of commercial uses.

It is an object of the invention to improve upon the arrangement of the various parts of a device of this kind in such a manner as to make it more efficient in action and more compact in structure so that it will be better adapted for use in combination with the internal combustion engines of self-propelled vehicles.

Other objects, advantages and features of the invention will hereinafter appear.

Referring to the accompanying drawings which illustrate what is at present deemed to be a preferred embodiment of the invention, Fig. 1 is a plan view of the combined heat exchanger and regulator with the cover removed and viewing the side thereof which is provided with the valve regulator and showing the exchanger and regulator built into one body for compactness.

Fig. 2 is a section on line 2—2 of Fig. 1, the cover being shown.

Fig. 3 is a view partly in section on line 3—3 of Fig. 2, the remaining plane of section being at the line where the regulator construction and exchanger meet.

Fig. 4 is a back view of the heat exchanger casing showing the course of the passage through which water flows to heat the device.

Fig. 5 is a plan view on an enlarged scale of a corner fragment of the cover which overlies the valve operating lever.

Fig. 6 is a general plan view, illustrating in a somewhat diagrammatic manner, the invention applied to a self-propelled vehicle.

Figure 7:
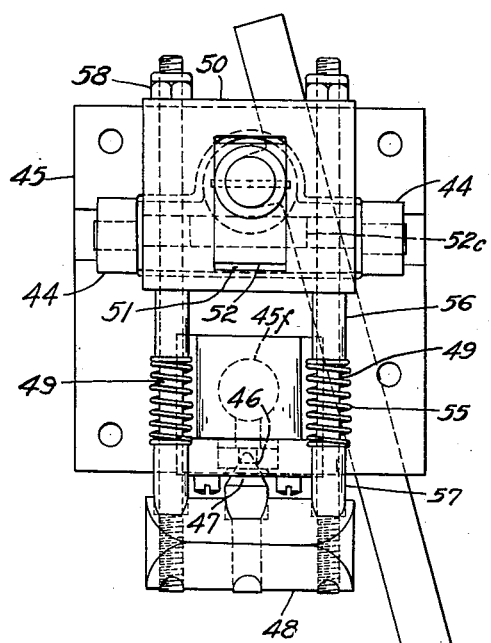
Fig. 7 is a rear elevation view of the pressure controlled automatic needle valve regulating device.
Figure 8:
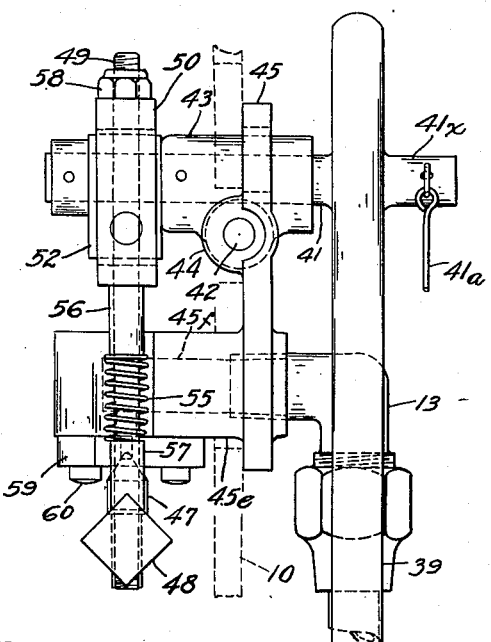
Fig. 8 is a side elevation of the structure shown in Fig. 7.
Figure 9:
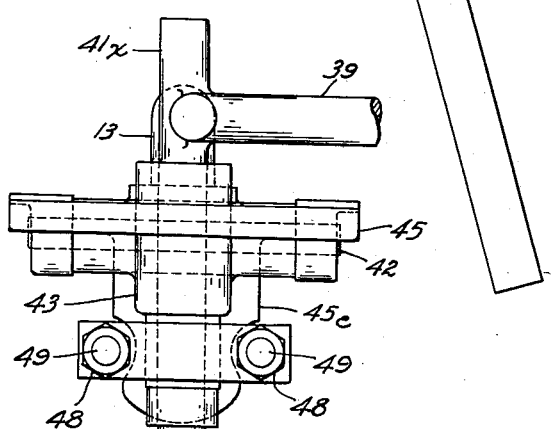
Fig. 9 is an end view of the structure shown in Figs. 7 and 8.

Referring in detail to the drawings, this converter comprises a heat exchanger and automatic fuel intake regulator built into one body for compactness. The three main parts of its casing are the main body or central portion 10 containing the heat exchanger structure, the front part or cover 11 housing the valve operating structure, and the back cover plate 12 forming a part of the heat exchanger unit.

The butane-propane mixture enters the supply conduit 13 and is thereby conducted to the valve structure 14 whence, after it passes through said structure it is delivered as a spray or wet vapor into the initial passage 16 of the heat exchanging portion of the device. This part of the device is made up of two halves, one of which is the back cover plate 12 and the other of which is afforded by the portion of the main or center body 10 which is in front of said back cover plate. The casing portion is furnished with a series of ribs which cooperate with the cover plate when the parts are assembled to form an elongated passage through which the expanded fuel in a wet vapor form passes in order to transfer to the fuel the desired amount of heat. After passing through the initial passage 16 it then flows through an opening 17 around the partition plate or rib 18 in the reverse direction through passage 17a. Then it passes through an opening 19 and flows in the reverse direction along the opposite side of the rib 20 which aids in forming another portion 21 of the passage. From said portion 21 it flows through an opening 22 and passes on the opposite side of the partition plate 23 through a passage 24 to the delivery pipe 25 which conveys it to the place of use.

In order to efficiently heat the fuel through the course which has just been described, the casing portion 10 in combination with the back cover 12 is constructed to afford a hot water jacket. This jacket is furnished with a water inlet 26 which conducts the water into the initial portion of a deep groove of the lateral passage 27 which extends around three sides of this part of the construction. Also a series of reversely directed ribs or baffles 28 are provided to occupy a circulatory space beneath the back cover plate 12. The course of the hot water through the device is indicated by arrows in Fig. 4 and need not be described in detail as the specific form of water circulatory elements shown, separately considered, is not claimed in the present application. After the hot water has circulated as stated it passes out through the outlet pipe 29.

By comparing the course taken by the hot water through the heating jacket as indicated by the arrows in Fig. 4 with that of the gas as indicated by the arrows in Fig. 3, it will be seen that each of these two fluids follows a reverse directional course of its own, said fluids being separated from each other only by a thin partition of heat conducting material, and the runs of the parallel water passages run transversely to those of the gas passages. Hence, in the main, the currents of gas and of hot water run crosswise in relation to each other, thus securing a uniform and very efficient transferrence of the heat from the water to the gas through the thin partition which separates them.

The casting which forms the center portion 10 of the device is furnished with a broad circular depression 30 which may extend into the space occupied by the reversely directed channels 16, 17, 17a, 21 and 24 that have been described, in order to economize space. Said depression forms one side of the diaphragm chamber 31 and said diaphragm 32 forms the opposite side of said chamber.

The bellows diaphragm 32 is attached to the casing side wall 33 by means of a marginal ring 34 through which extend a series of attaching screws 35 which are anchored in said casing wall. Over the central portion of the diaphragm 32 is placed a circular follower plate 36, a protecting leather disk 37 being interposed between said follower plate and the diaphragm. To the central portion of the plate 36 is secured a clamping member 38 having through it a bore or circular passage which receives an end portion of the valve operating rod 39, said rod being clamped thereto by means of clamping screws 40.

The valve operating rod 39 carries an angularly directed arm 41. Said arm 41 has an outwardly directed portion 41x with which is connected one end of a spiral traction spring 41a the opposite end of said spring being anchored to a post or clip 41b. When the device is combined with an internal combustion engine, said spring acts upon the valve operating means in opposition to the force of the diaphragm when the latter is moved outwardly by the suction from the engine manifold.

If the device is used without a spring tending to close the valve then it will operate at a slight positive pressure of gas. If desired the device may be constructed to be operable in some other situations by a positive pressure instead of a negative pressure. In the latter case a regulatable compression spring would be used in place of the tension spring shown.

The arm 41 forms a part of the valve operating structure, which is rockably supported by its pivot shaft 42. Said lever is provided with a transversely extending bearing sleeve 43 which is mounted upon said shaft 42 with a working fit. This shaft is supported at each end by an apertured ear or lug 44 on the valve plate 45. Said valve plate has a downward extension 45e with a passage 45f leading down into it and opening out through the valve seat 46. The opposite end of said passage communicates with the fuel supply tube 13.

The needle valve structure includes the seat portion 46 and the needle valve 47 which cooperates with said seat. Said valve is mounted upon a cross head 48 which in turn has each end portion secured to a link rod 49. At their opposite ends the two link rods 49 are connected by a rectangular yoke or two-part clamping block 50 which has an opening 51 through it. Through said opening projects the adjacent end portion of the valve operating arm 41, being at this point furnished with a head 52 which is connected by a pivotal connection 52c with the adjacent side portions of the yoke 50.

By the valve structure which has been described, when suction occurs within the bellows chamber 31a the valve operating rod 39 is slightly tilted thus causing the valve operating lever 41 to be moved in such a direction as to open the valve through the action of the yoke 50, the link rods 49 and cross bar 48 which carries the needle portion of the valve.

The valve mounting plate 45 is attached to one face of the casing body 10 there being at this point a large rectangular opening 45a through the casing wall, said plate being secured in place by any suitable means, for example, screws 45s. By this arangement the valve carrying extension 45e as well as the valve operating yoke 50 and parts adjacent thereto, are positioned within the casing body 10 when said valve mounting plate is secured in place.

As shown in Fig. 2 the fuel outlet pipe 25 communicates with this part of the casing. Hence when said fuel pipe is connected with a suitable gas-air mixing device to supply an internal combustion engine, engine suction will cause the fuel to be delivered through the valve seat 46 as a spray (the device desirably being positioned so as to direct said spray downwardly) and then the flow of the fuel will be reversely directed and it will pass around the extension 45e of the valve mounting plate and will be delivered to the fuel conduit 25.

Describing in further detail the valve operating and regulating means, each of the link rods 49 is furnished in the space between the clamping block 50 and the cross head 48 with a spiral compression spring 55 which is coiled around it, and is also furnished in said space with two sleeves 56 and 57 against which the end portions of said spring abut. At one end each link rod 49 has a screw threaded connection with the cross head 48 and at its opposite end said rod has screwed on to it a regulating nut 58. By this construction it is possible to adjust the length of the link rods and thereby affect the opening and closing movements of the needle valve 47 with relation to its seat 46. Said valve seat 46 is shown formed in a seat plate 59 removably secured by screws 60.

The valve mounting construction which has been described, is of a space economizing character and is readily attached to and detached from the exterior surface of the casing wall in an overlying relation to the aperture 45a, a portion of said aperture being left uncovered in order to afford a free communication between the central portion 10 of the casing and the diaphragm operating chamber seen in Fig. 2. under the cover 11. The chamber at the opposite side of the diaphragm is furnished with a passage 30p which communicates with the atmosphere through a pipe 30v. The link rods 49 which form a part of the operating connection for the valve also form parts of a stirrup-like construction one end of which carries the closure element of the valve and the other end portion of which is pivotally connected to the inner portion of the valve operating means which is located interiorly of the casing. The opening 51 through the block 50 is of such a size and shape that its end portions form stop means which limit the range of movement of the valve closure element thereby keeping it within an operative relation to its seat and forming what might be termed a pendulous support for the valve construction. In operation the valve carrying end of the stirrup structure will ordinarily be directed downwardly.

Fig. 6 illustrates, in a somewhat diagrammatical manner, the application of the invention to an internal combustion engine. The "Gas Air Mixer" which is supplied through the conduit 25 with prepared gas from the casing which underlies the cover 11, may be constructed as set forth in my gas and air mixing device, patented October 16, 1934, No. 1,977,168. The assemblage of the device in relation to an internal combustion engine will be readily understood from this view, and also how it operates under the action of engine suction through conduit 25.

The plugs 61 are positioned in the bottom wall of the casing 10 in the passage 27 to flush out sediment accumulated therein. A priming button 62 is provided in the cover 11.

I claim:

1. In a construction of the kind described, a casing, a hot water jacket occupying exterior portions of said casing and having parallel, connected channels causing a reverse flow of water through it, means whereby a tortuous fuel passage having parallel connected runs which extend crosswise to said water channels is constructed within said casing interiorly of said jacket, a diaphragm housing associated with said casing and having a diaphragm chamber which is in communication with said fuel passage, there being a diaphragm operated by varying pressure within said diaphragm chamber, a valve controlling supply of fuel passing through said fuel passage, and means operatively relating said diaphragm to said valve, the aforesaid water channels and fuel runs being separated only by a partition plate.

2. In a construction of the kind described, a casing having a length and breadth great in proportion to its thickness, a hot water jacket occupying a face portion and edge portions of said casing, transverse partition means within said casing to form a tortuous passage therethrough within the space embraced by said jacket, there being a diaphragm chamber formed in a lateral relation to said casing, a diaphragm actuated by the increase and diminution of pressure within said tortuous passage and diaphragm chamber, a valve, means operatively relating said diaphragm to said valve, and a fuel supply leading through said tortuous passage and controlled by said valve, the hot water chamber within said jacket being separated from said tortuous passage by a single wall, and the fluids on the opposite sides of said wall flowing crosswise in relation to each other.

3. In a construction of the kind described, a casing having a length and breath great in proportion to its thickness, a hot water jacket occupying exterior edge portions of said casing and also overlying a face portion thereof which is embraced within said edge portions, partition means within said casing embraced by said jacket and arranged to form a tortuous fuel passage, there being an opening through a wall of said casing, a valve mounting plate securable exteriorly of said casing wall adjacent to said opening, said plate having a valve supporting extension projecting from the face thereof which is directed toward the interior of the casing when the plate is attached, a valve seat carried by said extension interiorly of the casing, there being a fuel supply passage leading from said seat through said extension to the exterior or outer side of said valve mounting plate, valve operating means carried by said plate and extending therethrough, a diaphragm operatively connected with said valve operating means, and a housing for said diaphragm containing a diaphragm chamber, said diaphragm chamber being in communication with said fuel passage thus providing for the operation of the diaphragm by means of a change of pressure within said fuel passage, said fuel passage having a fuel supply outlet, the hot water chamber within said jacket being separated from said tortuous passage by a single wall and the fluids on the opposite sides of said wall flowing crosswise in relation to each other.

4. In a construction of the kind described, a casing having a length and breadth great in proportion to its thickness, a hot water jacket occupying edge portions of said casing, there being a diaphragm chamber formed in a lateral relation to said casing, a diaphragm therein actuated by the increase and diminution of pressure within the portion of said chamber embraced by said jacket, a valve, means operatively relating said diaphragm to said valve, a fuel supply communicating with the portion of said casing within said jacket, this portion of the casing having an outlet, and means to conduct the fuel from said outlet to said valve, said hot water jacket embracing three edge portions of the portion of said casing with which said fuel supply communicates and also overlying the face portion thereof embraced within said edge portions.

SAMUEL BARTON BROWN.